United States Patent [19]

Varnham

[11] Patent Number: 5,022,754

[45] Date of Patent: Jun. 11, 1991

[54] DETERMINING THE WAVELENGTH OF OPTICAL RADIATION

[75] Inventor: Malcolm P. Varnham, Stevenage, United Kingdom

[73] Assignee: British Aerospace Public Limited Company, London, England

[21] Appl. No.: 390,247

[22] Filed: Aug. 7, 1989

[51] Int. Cl.$^5$ ............................ G01J 3/00; G01B 9/02
[52] U.S. Cl. ...................................... 356/300; 356/44; 356/345; 356/350
[58] Field of Search ................. 356/300, 44, 350, 345; 350/96.13

[56] References Cited

U.S. PATENT DOCUMENTS 4,671,651 6/1987 Toyoda et al. ........................ 356/44
4,842,358 6/1989 Hall ...................................... 356/350

Primary Examiner—Vincent P. McGraw
Assistant Examiner—LaCharles P. Keesee
Attorney, Agent, or Firm—Cushman, Darby & Cushman

[57] ABSTRACT

This invention relates to a method and apparatus, i.e. a "wavelength meter", for determining the wavelength of optical radiation, e.g., visible radiation. Radiation is subjected to two or more wavelength dependent phase modulations having a net effect which is wavelength dependent and is zero at a predetermined wavelength. The net modulation is then determined so as to obtain the difference between the predetermined wavelength and the actual wavelength of the radiation.

6 Claims, 3 Drawing Sheets

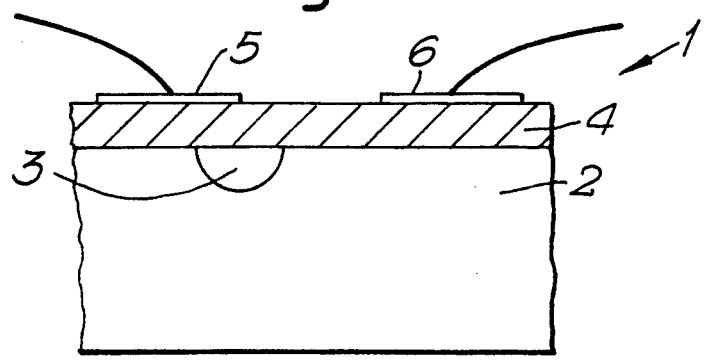
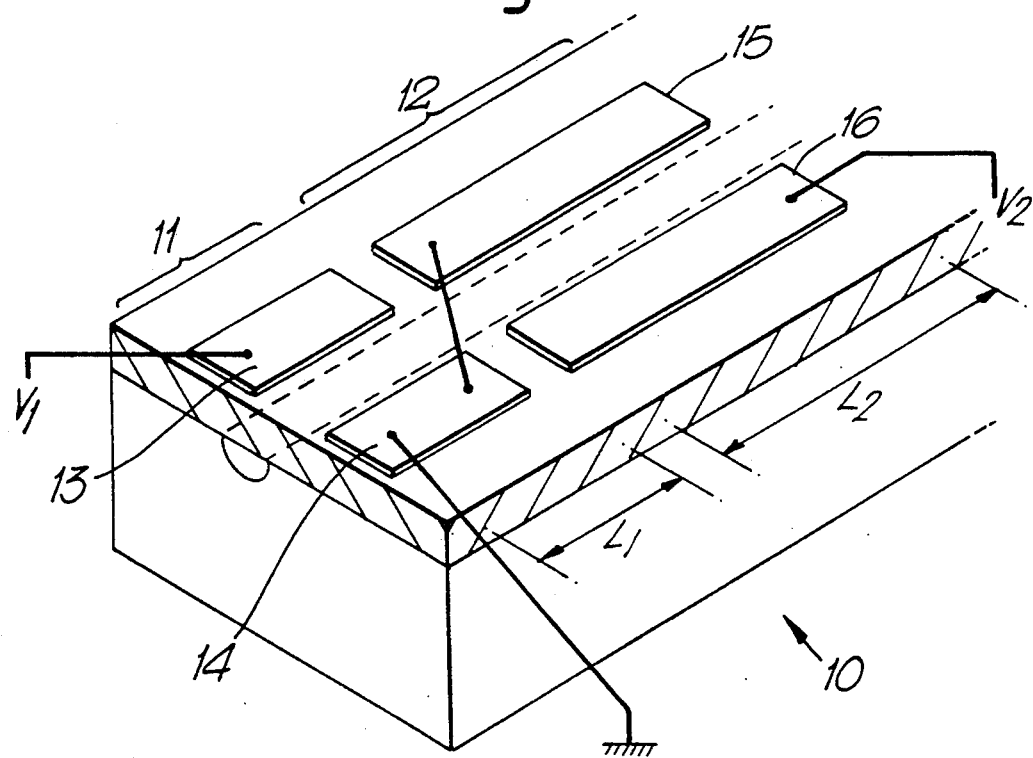

DETERMINING THE WAVELENGTH OF OPTICAL RADIATION

This invention relates to a method and apparatus, i.e. a "wavelength meter", for determining the wavelength of optical radiation, eg. visible radiation.

There are many applications which require the measurement of optical radiation wavelength, perhaps with a view to stabilising or controlling that wavelength. Conventional methods of measurement include using monochrometers or estimating the wavelength from measurements of the temperature of the source. However for some applications, such methods require apparatus which is generally too bulky, expensive or insufficiently accurate to be practical. This is especially so for fibre-optic sensors and communication systems.

An example of an application where the use of such a wavelength meter would be useful is the fibre-optic gyroscope. Here, the scale factor of the gyroscope (that is the scaling of the measured rotation rate compared to the applied rotation rate) is dependent on wavelength. The problem is that the wavelength of the light from some optical sources such as edge emitting light emitting diodes (ELEDs) which are otherwise very suitable for use in a fibre optic gyroscope, varies with temperature thus making the fibre-optic gyroscope's scale factor strongly dependent on temperature.

One object of the invention is to provide an alternative form of wavelength meter suitable for incorporation into a fibre-optic gyroscope so that it becomes possible to either stabilise the wavelength and/or provide an output which could be used to correct for the scale factor of the gyro.

A further object of the present invention is to provide a wavelength meter which can be fabricated using integrated-optics technology.

Yet a third object is to provide a wavelength meter which can be implemented as an additional function in an integrated optics device intended for use in a fibre optic gyroscope and having as its main function say the phase modulation of light passing through the device thereby providing said additional function at relatively small additional cost.

According to a first aspect of the present invention there is provided a method of determining the wavelength of optical radiation, which method comprises subjecting the radiation to a plurality of wavelength dependent, phase modulations together having a net phase modulating effect which varies with wavelength and which is zero at a predetermined wavelength, and then determining the net phase modulation of the radiation so as to determine the difference between its wavelength and said predetermined wavelength.

According to a second aspect of the present invention there is provided apparatus for determining the wavelength of optical radiation comprising phase modulating means for subjecting the optical radiation to a plurality of wavelength dependent, phase modulators having a net phase modulating effect which varies with wavelength of the radiation and which is zero at a predetermined wavelength of the radiation, the apparatus further comprising phase measuring means for determining the net phase modulation undergone by the radiation.

According to a third aspect of the present invention there is provided optical apparatus comprising a wavelength controllable optical radiation source, phase modulating means for subjecting radiation from the source to a plurality of wavelength dependent, phase modulators having a net phase modulating effect which varies with wavelength of the radiation and which is zero at a predetermined wavelength of the radiation; and wavelength regulating means for responding to variations of the net phase modulation undergone by said radiation and for correspondingly controlling the wavelength of the radiation produced by said source.

According to a fourth aspect of the present invention there is provided optical apparatus for investigating a predetermined physical parameter, the apparatus comprising:

optical transducer means for receiving optical radiation and for causing a characteristic of that radiation to be dependent upon said physical parameter;

measuring means for receiving said radiation from the transducer means and for measuring said characteristic in order to determine said parameter;

phase modulating means for receiving said optical radiation and for subjecting the radiation to a plurality of wavelength dependent, phase modulations having a net phase modulating effect which varies with wavelength of the radiation and which is zero at a predetermined wavelength of the radiation; and phase sensing means for receiving optical radiation from the phase modulating means, for determining the net phase modulation undergone by the radiation and independence upon that determination, supplying information about the wavelength of the radiation to said measuring means.

According to a fifth aspect of the present invention there is provided a wavelength meter comprising a substrate layer with a waveguide diffused therethrough for transmitting light in use, and two concatenated phase modulators running substantially parallel to the wave-guide and supported by said substrate; in which said modulators each comprise a pair of substantially parallel elongate electrodes; in use, when a voltage is applied to each pair said electrodes, an electric field is produced which overlaps the field of any light passing through said waveguide, such as to impart a phase difference to said light whose dependence with wavelength is substantially different for the respective modulators, further in which the dimensions of the modulators and respective voltages applied thereto are predetermined such as to produce no net phase shift for light of a certain predetermined wavelength.

Reference will now be made, by way of example, to the accompanying drawings in which:

FIG. 1 is a cross sectional diagram of a phase modulator fabricated in a Z-cut Lithium Niobate crystal;

FIG. 2 is of a wavelength meter including two phase modulators as shown in FIG. 1;

Figure 3:
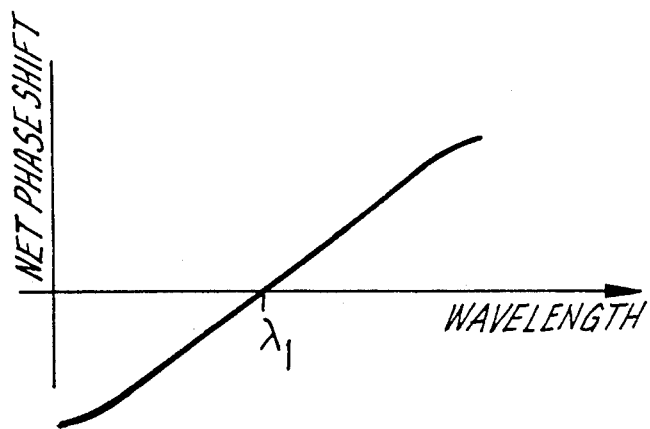
FIG. 3 is a graph of net phase shift against wavelength for the FIG. 2 wavelength meter.

Referring to FIG. 1 the phase modulator shown generally at 1, comprises a substrate 2 of Lithium Niobate into which a single-mode waveguide 3 has been diffused. Above the waveguide is a layer of silica 4 and above this there are two electrodes 5 and 6. When a voltage is applied across the electrodes, an electric field is set up which alters the refractive index of the waveguide 3. Any light passing along the waveguide will experience a phase shift which is dependent on the applied voltage. The amplitude of this phase shift depends on the length of the waveguide, the electro-optic constants, the refractive indices of the material, the wavelength and the design of the electrodes.

Referring to FIG. 2, a wavelength meter 10 according to the present invention includes two phase modulators 11 and 12 similar to that of FIG. 1. The two modulators, each with different electrode designs, are connected in series such that the phase shifts applied by voltages $V_1$ and $V_2$ cancel each other out at a particular wavelength. The cancellation for a particular wavelength can be achieved by applying the same voltage to both sets of electrodes (i.e.: $V_1 = V_2$) and choosing the relative lengths of electrodes 13,14 and 15,16, by applying a different voltage to each modulator, or by a combination of both methods. By varying the modulator designs the cancellation may also be achieved.

The phase shift induced by each modulator 11 or 12 is dependent on the overlap of the electric field between the electrodes 13,14 and 15,16 respectively, and the optical field of the mode travelling along the waveguide. If the distribution of the electric field from the modulators 11 and 12 is different then, in general, they will overlap differently with the optical mode in the waveguide. Thus one modulator will need to be longer, or alternatively the voltage on one of the electrodes needs to be greater for the two phase modulations to cancel each other. However, the phase shifts will be dependent on the mode shape of the light travelling along the waveguide. The mode shape is dependent on wavelength. Thus if the variation with wavelength is different for each modulator then cancellation can be arranged to occur at only one wavelength, as shown in FIG. 3.

In general the phase of the modulators may be varied by changing, any combination of the following parameters:
(a) the position of the wave guides relative to the electrodes
(b) the lengths of the pairs of electrodes of each modulator;
(c) the voltages applied to the electrodes; and/or
(d) design of the waveguide.

Figure 4A:
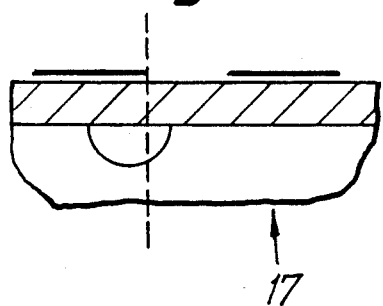
FIGS. 4A–4C are cross sectional diagram of several different phase modulator designs.
Figure 4B:
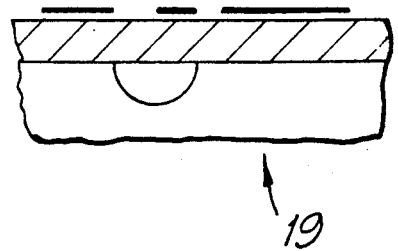
Figure 4C:
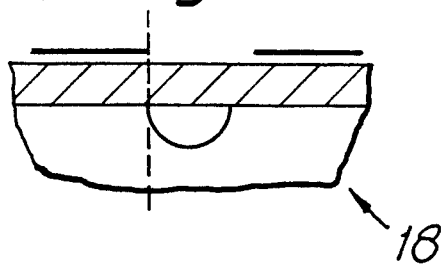

Examples of different modulator designs are shown in FIG. 4. Modulators 17 and 18 are different because there will be a different overlap of the electric field with the guided mode in the waveguide. This is because modulator 17 is more efficient than modulator 18 in that a stronger overlap will occur. Modulator 19 is a design in which the two outer electrodes are connected together, and the signal is applied on the inner electrode. Any two of these modulators could be connected together in series and used as a wavelength meter because their phase shift versus wavelength characteristics will be different. These examples apply to z-cut Lithium Niobate integrated optics devices. However, the same principle can be applied to any other form of integrated optics for example those made of x-cut Lithium Nibate, Gallium Arsenide or Indium Phosphide.

The above description is a simplification because it is the mode shape that changes with wavelength, so that the meter responds to changes in mode shape and not to wavelength directly. Nevertheless, the relationship between mode shape and wavelength is strong enough to enable a wavelength meter to be made. Temperature dependent variations will be systematic and could be compensated by measuring the integrated optic device temperature.

In practice, the above wavelength meter would have to be used in a system which could measure the phase shifts which characterise the wavelength variation. Such systems would include interferometers and polarimeters or other systems into which could be added an interferometer or polarimeter into which the wavelength meter is incorporated. The phase shifts applied would probably be modulated, say by a sinusoidal waveform.

Figure 5:
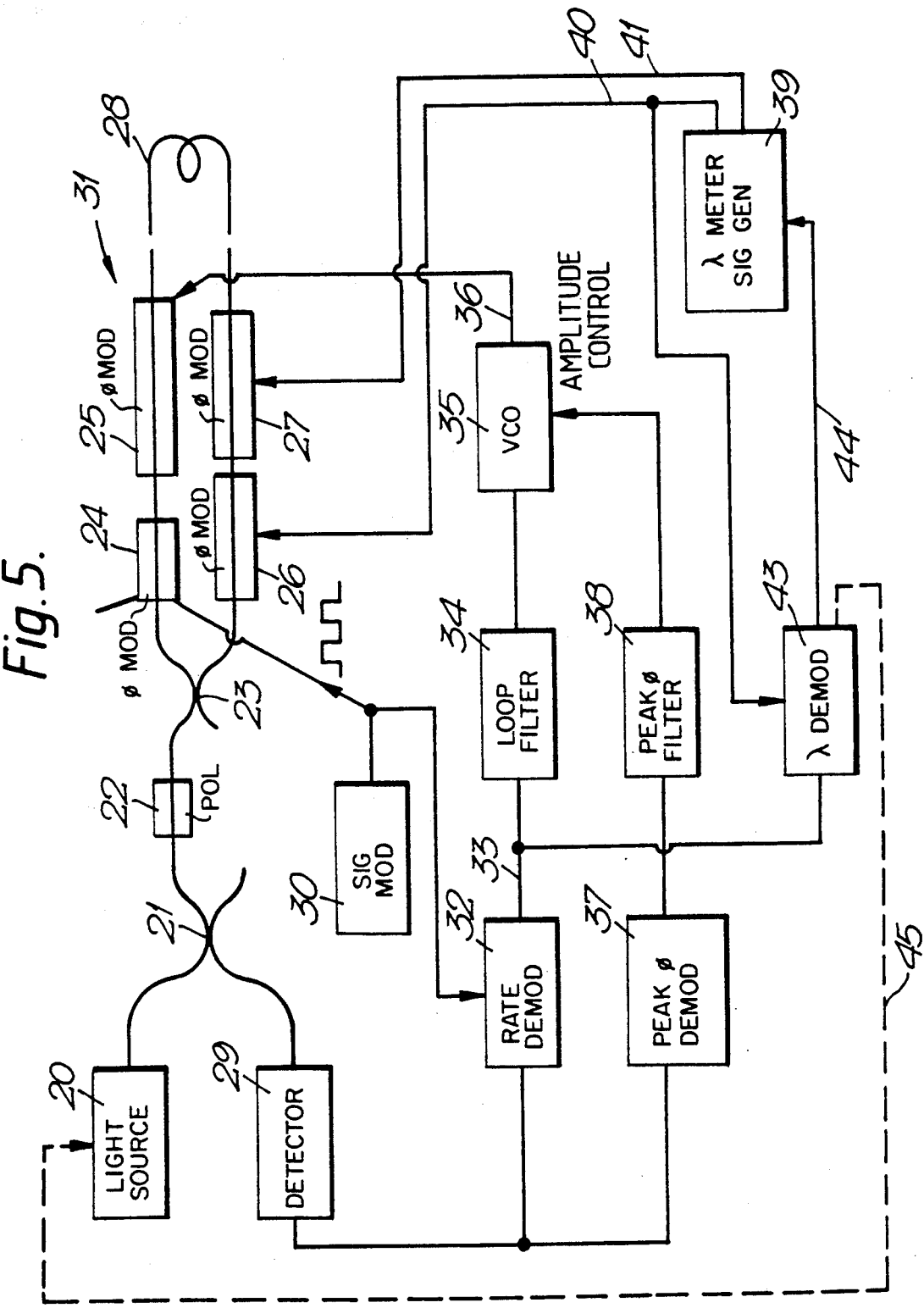
FIG. 5 is a block diagram of a fibre optic gyroscope including the wavelength meter of FIG. 2.

By way of an example only, a possible application for the wavelength meter is a fibre-optic gyroscope, one configuration of which is shown in FIG. 5. Here light from a source 20 is coupled into a fibre coupler 21, then a polariser 22, then another optical power divider 23, (such as a coupler or a Y junction) and then through several phase modulators 24, 25, 26 and 27. The light is then coupled into both ends of the fibre-optic coil 28. The returning light passes back through the modulators, the optical power divider, the polariser and the coupler, and is passed to a detector 29. Such an arrangement is the optical subsystem of a fibre-optic gyroscope, or a Sagnac interferometer. The integrated optics device could contain only the modulators or the modulators and a combination (perhaps all) of the couplers, polariser or in the case of a III-V semiconductor integrated optic devices, the source and detector as well.

A signal modulator 30 drives the electrodes of modulator 24 on the integrated optics chip shown generally at 31. The purpose of the signal is to determine whether any non-reciprocal phase shift is present between the two waveforms passing around the coil. A possible waveform is a squarewave of amplitude $\pm \pi/4$ and of frequency $1/2T$, where T is the time delay around the coil. If a non-reciprocity occurs around the coil, then this can be detected by synchronously demodulating the waveform in the rate demodulator 32. The output 33 of the rate demodulator is integrated by the loop filter 34 and drives the serrodyne voltage controlled oscillator (VCO) 35 whose output 36 is used to null the non-reciprocity seen by the rate demodulator. The output of the VCO is passed to modulator 25 to null the non-reciprocity seen by the rate demodulator. The output of the serrodyne VCO is a sawtooth of ideal peak to peak amplitude $2 m\pi$, where m is an integer. The amplitude is controlled by the peak phase demodulator 37, which is driven by error pulses occurring synchronously with the resets of the serrodyne waveform. Errors are output to the peak phase loop filter 38 to control the serrodyne VCO amplitude at $2 m\pi$.

Such a fibre-optic gyroscope is typical of systems requiring accurate wavelength measurement for which the proposed wavelength meter would be appropriate.

The wavelength meter signal generator 39 outputs two sinusoidal signals 40 and 41 to the two wavelength meter modulators 26 and 27 respectively such that at the centre wavelength there is no net modulation seen on the detector. The modulation frequency is chosen to be higher than the closed loop response of the rate loop, and smaller than the bandwidth of the gyroscope's rate demodulator.

A wavelength demodulator 43 demodulates signal 33 with respect to signal 40. The resultant signal 44 is driven to zero when link 45 is connected.

Signals on the rate demodulator output which are demodulated synchronously with the wavelength meter signal generator signal are a measure of the wavelength error in the system. The output can be used in various ways. For example, it can be monitored by a microprocessor (not shown) which can provide scale factor corrections. Alternatively it could be used as the control signal for a wavelength controller (such as a Peltier), (also not shown) on the light source. In another scheme, the voltage ratios of the signals sent to the wavelength meter could be controlled in a closed loop so that a new null is obtained. The voltage ratio could then be read by a microprocessor which would correct for scale factor.

The frequency of the wavelength meter signal generator 39 used in the fibre gyro system shown in FIG. 5 needs to be relatively high (say between 0.1 and 0.9 times the frequency of signal generator 30 in order to increase the sensitivity of the meter when used in a Sagnac interferometer.

The wavelength meter signal generator can use a pseudo-random signal when used in the system shown in FIG. 5. The advantage of this is that it can avoid the different loops acquiring subharmonic, or harmonic lock-ins.

Although the fibre gyro system shown in FIG. 5 has the wavelength meter incorporated into one arm of the Sagnac interferometer, the modulator (both signal and wavelength meter) could be used in a push-pull arrangement (i.e. half of each on either side of the integrated optics), or a combination of the two schemes. In addition, the wavelength meter could equally well be used in a Mach Zehnder interferometer, (or other types of interferometer or polarimeter) either placed in one of the waveguides between the source or detector and Sagnac interferometer, or placed completely separate from the Sagnac interferometer. The latter scheme would use light from the spare leg of the coupler nearest to the source from which half the source power emerges and is currently lost to the system.

Further applications in which a wavelength meter as described may be used include coherent communications systems or fibre optic sensors.

It should be noted that the wavelength to be measured may be determined either before or after construction of the device.

The relative positions of the modulators are not of importance. Any combination could be used in order to carry out the invention.

Further either electrical or optical "push-pull" arrangements may be used in a known manner, in the wavelength meter.

I claim:

1. A method of determining a wavelength of interest of optical radiation, which method comprises:
   subjecting the radiation to a plurality of wavelength dependent phase modulations, together having a net phase modulating effect which varies with wavelength and which is zero at a predetermined wavelength,
   then determining a net phase modulation of the radiation; and
   then determining a difference between said wavelength of interest and said predetermined wavelength from said net phase modulation to determine said wavelength of interest.

2. Apparatus for determining a wavelength of interest of optical radiation comprising:
   phase modulating means for subjecting the optical radiation to a plurality of wavelength dependent phase modulations having a net phase modulating effect which varies with wavelength of the radiation and which is zero at a predetermined wavelength of the radiation, and
   phase measuring means for determining the net phase modulation undergone by the radiation and determining said wavelength of interest based on a difference between said net phase modulation and said predetermined wavelength.

3. Optical apparatus comprising:
   a wavelength controllable optical radiation source,
   phase modulating means for subjecting radiation from the source to a plurality of wavelength dependent phase modulators having a net phase modulating effect which varies with wavelength of the radiation and which is zero at a predetermined wavelength of the radiation; and
   wavelength regulating means responsive to variations of the net phase modulation undergone by said radiation, for determining a wavelength of said radiation from said source and correspondingly controlling the wavelength of the radiation produced by said source.

4. A method according to claim 1 where the difference in measured wavelength is a function of temperature, and comprising the further step of determining said temperature therefrom.

5. Optical apparatus for investigating a predetermined physical parameter, the apparatus comprising:
   optical transducer means for receiving optical radiation and for causing a characteristic of that radiation to be dependent upon said physical parameter;
   measuring means for receiving said radiation from the transducer means and for measuring said characteristic in order to determine said parameter;
   phase modulating means for receiving said optical radiation and for subjecting the radiation to a plurality of wavelength dependent, phase modulators having a net phase modulating effect which varies with wavelength of the radiation and which is zero at a predetermined wavelength of the radiation, and
   phase sensing means for receiving optical radiation from the phase modulating means, for determining a net phase modulation undergone by the radiation and in dependence upon that determination, determining the wavelength of the radiation and supplying same to said measuring means.

6. A wavelength meter comprising:
   a substrate layer with a waveguide diffused therethrough for transmitting light in use, and two concatenated phase modulators running substantially parallel to the waveguide and supported by said substrate; in which said modulators each comprise a pair of substantially parallel elongate electrodes of a type that when a voltage is applied to each pair of said electrodes an electric field is produced which overlaps the electric field of any light passing through said waveguide, such as to impart a phase difference to said light, that is substantially different for the respective modulators, wherein the dimensions of the modulators and respective voltages applied thereto are predetermined such as to produce no net phase shift for light of a certain predetermined wavelength.

* * * * *